Patented Jan. 22, 1929.

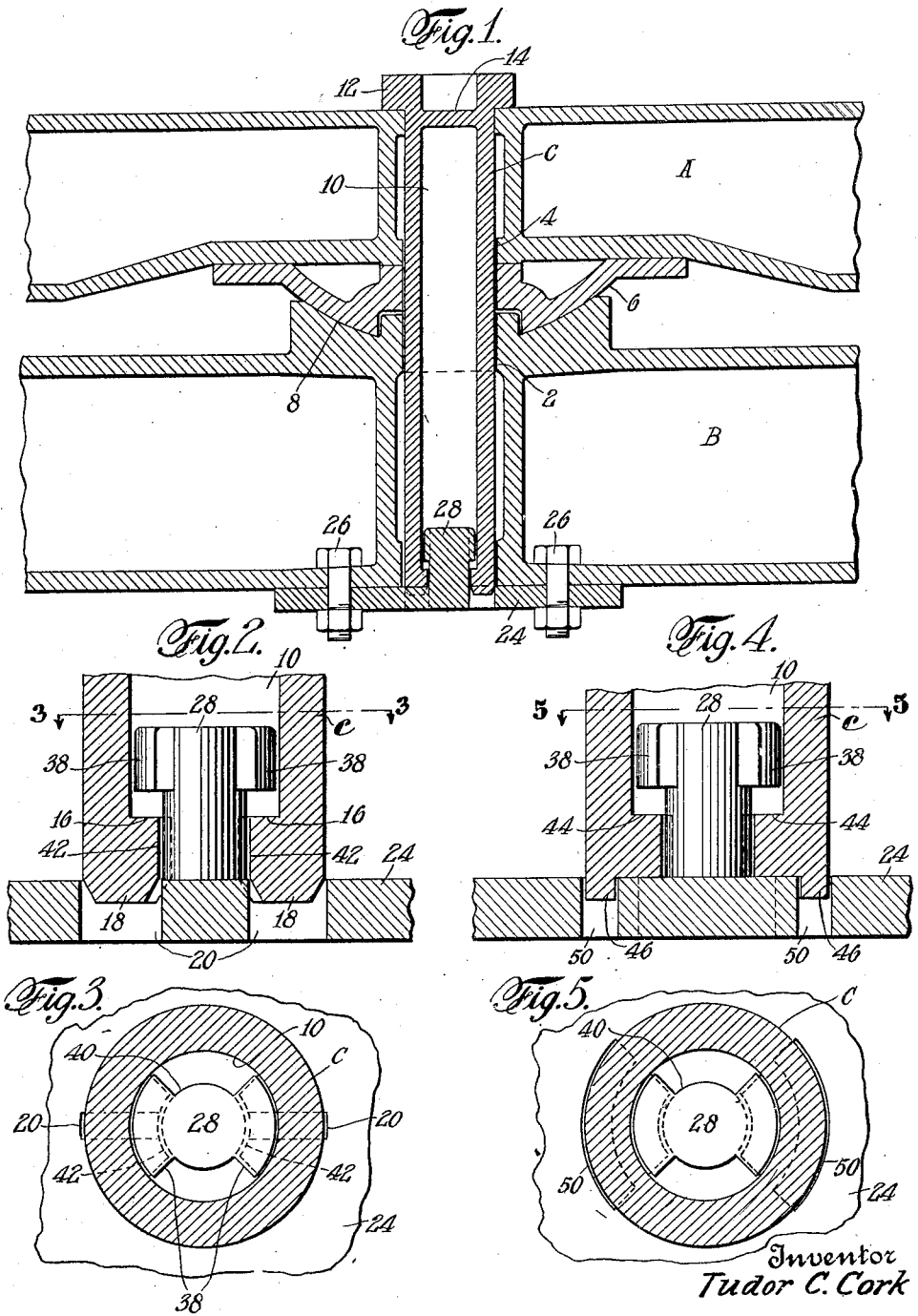

1,699,521

UNITED STATES PATENT OFFICE.

TUDOR C. CORK, OF NEW YORK, N. Y., ASSIGNOR TO AMERICAN CAR AND FOUNDRY COMPANY, OF NEW YORK, N. Y., A CORPORATION OF NEW JERSEY.

CAR CONSTRUCTION.

Application filed February 4, 1928. Serial No. 251,893.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In the drawings:

Figure 1 is a transverse sectional view through the body and truck bolsters of the car;

Fig. 2 is an enlarged detail view, partly in section, showing the locking means for the king pin;

Fig. 3 is a sectional view on the line 3—3 of Fig. 2;

Fig. 4 is an enlarged detail view, partly in section, showing a modified form of locking means for the king pin, and;

Fig. 5 is a sectional view on the line 5—5 of Fig. 4.

This invention relates to means for connecting car trucks to car bodies in such a manner that the necessary flexibility between the car body and the car truck is not impaired.

One object of the invention is the provision of means for connecting the truck and body bolsters of a railway car.

Another object of the invention is the provision of means for connecting the truck and body bolsters of a railway car, said means being retained against displacement.

A further object of the invention is the provision of a king pin for connecting the body and truck bolsters of a railway car, which pin is positively retained against displacement in its connecting position.

Other objects and advantages of this invention will be apparent from the following description taken with the accompanying drawings, in which A indicates the body bolster of the car and B indicates the truck bolster, the latter underlying the body bolster and having a central aperture 2 alined with the aperture 4 in the body bolster. The lower face of the body bolster A is provided with a convexed surface bearing member 6 which seats in and is centered by a concave surfaced bearing member 8 carried by or formed as a part of the truck bolster B.

The king pin for connecting the bolsters A and B is indicated generally at C and comprises a tubular body portion 10 having a head 12 which seats on the upper surface of the body bolster. For manipulating the pin C a handle 14 is provided adjacent the head 12.

Figs. 2 and 4 disclose modified forms of the lower end of the king pin and now, referring to Fig. 2, it can be seen that the lower end of the body portion 10 is provided with oppositely disposed inwardly extending lugs 16, each provided with a depending extension 18 in the form of ribs, which ribs are adapted to be received within slots 20 formed in a retaining plate 24 secured as by bolts 26 to the lower surface of the truck bolster. It will be apparent that the slots 20 will prevent rotation of the king pin when the lug extensions 18 are extended therein.

The retaining plate 24 is provided with an integral upstanding keeper 28 having oppositely arranged wings 38 formed at the upper end thereof, arranged over the before-mentioned slots 20. In effect, the keeper comprises an upstanding projection around which the lower end of the tubular king pin is arranged, the projection having flanges at its upper end provided with cut-out portions or areas 40. The drawings show the keeper as cylindrical and the inner faces 42 of the lugs 16 are shown as cylindrical to be complemental with the keeper, but it is to be understood that the disclosure in the drawings is merely by way of example, as obviously the keeper may assume any desired form.

Referring now to Fig. 4, the lower end of the king pin C is provided with oppositely disposed inwardly extending lugs 44 which are arranged to seat on the upper surface of the plate 24. As in Fig. 2, the lugs 44 are arranged beneath the wings 38 formed on the keeper 28, but the extreme lower end of the king pin is provided with oppositely disposed arcuate ribs 46 which are adapted to be positioned in the oppositely arranged arcuate slots 50 formed in the plate 24 whereby to prevent rotation of the king pin.

It is believed that the construction of the device will be fully apparent to those skilled in the art, and now referring to the operation of the device, it can be seen that when it is desired to connect the body bolster and the truck bolster, the body bolster is centered on the truck bolster with the apertures 2 and 4 of the bolsters in alinement. The king pin is then inserted through these apertures and rotated until the lugs 16 aline with the open areas 40 between the wings 38, whereupon the king pin may be dropped to the plate 24. When the lower end of the king pin is in engagement with the plate 24, or when the upper edge of the lugs 16 is in such postion as to clear the lower edge of the wings 38, the king pin is then rotated until the extensions at the bottom of the lugs fall into the slots 20 or 50 in the plate 24. The king pin, it will be apparent, is now in connected locked relation and displacement thereof is prevented. If the king pin has a tendency to leave the slots 20 or 50, it will be apparent that this will be prevented due to the engagement of the upper surface of the lugs 16 with the lower surface of the wings 38. In removing the king pin, the latter is elevated until the extensions on the bottom of the lugs clear the apertures in the plate 24, whereupon the king pin may be rotated until the lugs 16 are in alinement with the open areas 40, and the king pin may then be elevated and removed from the bolsters in an obvious manner.

What is claimed is:

1. In combination with truck and body bolsters, a retaining plate having spaced perforations, a king pin pivotally connecting said bolsters and extending into the perforations in the retaining plate, a keeper carried by the retaining plate, spaced locking elements on the keeper, and spaced locking elements on the king pin arranged under the first named locking elements.

2. In combination with truck and body bolsters, a retaining plate having spaced perforations, a king pin pivotally connecting said bolsters and extending into the perforations in the retaining plate, a keeper carried by the retaining plate, spaced locking elements on the keeper arranged over the before-mentioned perforations, and spaced locking elements on the king pin arranged under the first named locking elements.

3. In combination with truck and body bolsters, a retaining plate secured to the lower surface of the truck bolster and provided with spaced perforations, a tubular king pin pivotally connecting said bolsters and seating on the retaining plate, extensions on the king pin engaged in the perforations to prevent rotation of said pin, a keeper carried by the retaining plate and extending into the king pin, spaced locking elements on the keeper, and spaced locking elements on the king pin engaging under the first named locking elements.

4. In combination with truck and body bolsters, a retaining plate secured to the lower surface of the truck bolster and provided with spaced perforations, a tubular king pin pivotally connecting said bolsters and provided with ribs engaging in the perforations in the retaining plate, a keeper carried by the retaining plate and extending into the king pin, spaced locking elements on the keeper arranged above the perforations in the retaining plate, and spaced locking elements on the king pin engaging under the first named locking elements.

5. In combination with truck and body bolsters, a tubular king pin connecting said bolsters and provided with spaced internal locking elements at its lower end, and means secured to the lower surface of the truck bolster and extending into the king pin to cooperate with the locking elements therein for preventing vertical displacement of said pin.

In witness whereof I have hereunto set my hand.

TUDOR C. CORK.